United States Patent [19]
Rein et al.

[11] 3,815,867
[45] June 11, 1974

[54] PRESSURE REGULATOR
[75] Inventors: Charles R. Rein; Charles B. Jones, both of Panama City, Fla.
[73] Assignee: The United States of America, as represented by the Secretary of the Navy, Washington, D.C.
[22] Filed: Apr. 16, 1973
[21] Appl. No.: 351,753

[52] U.S. Cl. ............................................. 251/61.3
[51] Int. Cl. ......................................... F16k 31/145
[58] Field of Search .............. 251/61.2, 61.3, 63.5; 137/625.48, 549, 550

[56] References Cited
UNITED STATES PATENTS
| | | | |
|---|---|---|---|
| 2,158,436 | 5/1939 | Shaw | 251/61.3 X |
| 2,517,061 | 8/1950 | Von Stackelberg | 137/625.48 X |
| 2,868,483 | 1/1959 | Krueger | 251/61.3 X |

Primary Examiner—Henry T. Klinsiek
Attorney, Agent, or Firm—Richard S. Sciascia; Don D. Doty; Harvey A. David

[57] ABSTRACT

A pressure regulator is disclosed as comprising a valve body having a first chamber, a second chamber, an open-ended bore disposed between said first and second chambers, and a third chamber extending from said second chamber. An entrance passageway extends through said valve body to effect fluid communication between said bore and the outside of said valve body. An exit passageway extends through said valve body to effect fluid communication between said first chamber and the outside of said valve body. A porous ring having an inside diameter equal to the inside diameter of said bore is located within said second chamber in contiguous disposition with said bore. A retention nut is connected between said porous ring and the inside diameter of said second chamber for retention of said porous ring therein, so that a portion of said second chamber extends around a portion of the outside surface thereof. A valve extends through said first chamber, through said bore for slidable movement therein, and through said porous ring in such manner as to effect metered fluid communication between said entrance and exit passageways through a portion of the aforesaid porous ring in accordance with the position thereof therein. An intermediate passageway interconnects a portion of said first, second, and third chambers and the aforesaid exit passageway. A bellows assembly is connected between one end of said valve body and said valve for effecting the movement thereof, in direct proportion to a controlling fluid presure applied thereto.

10 Claims, 3 Drawing Figures

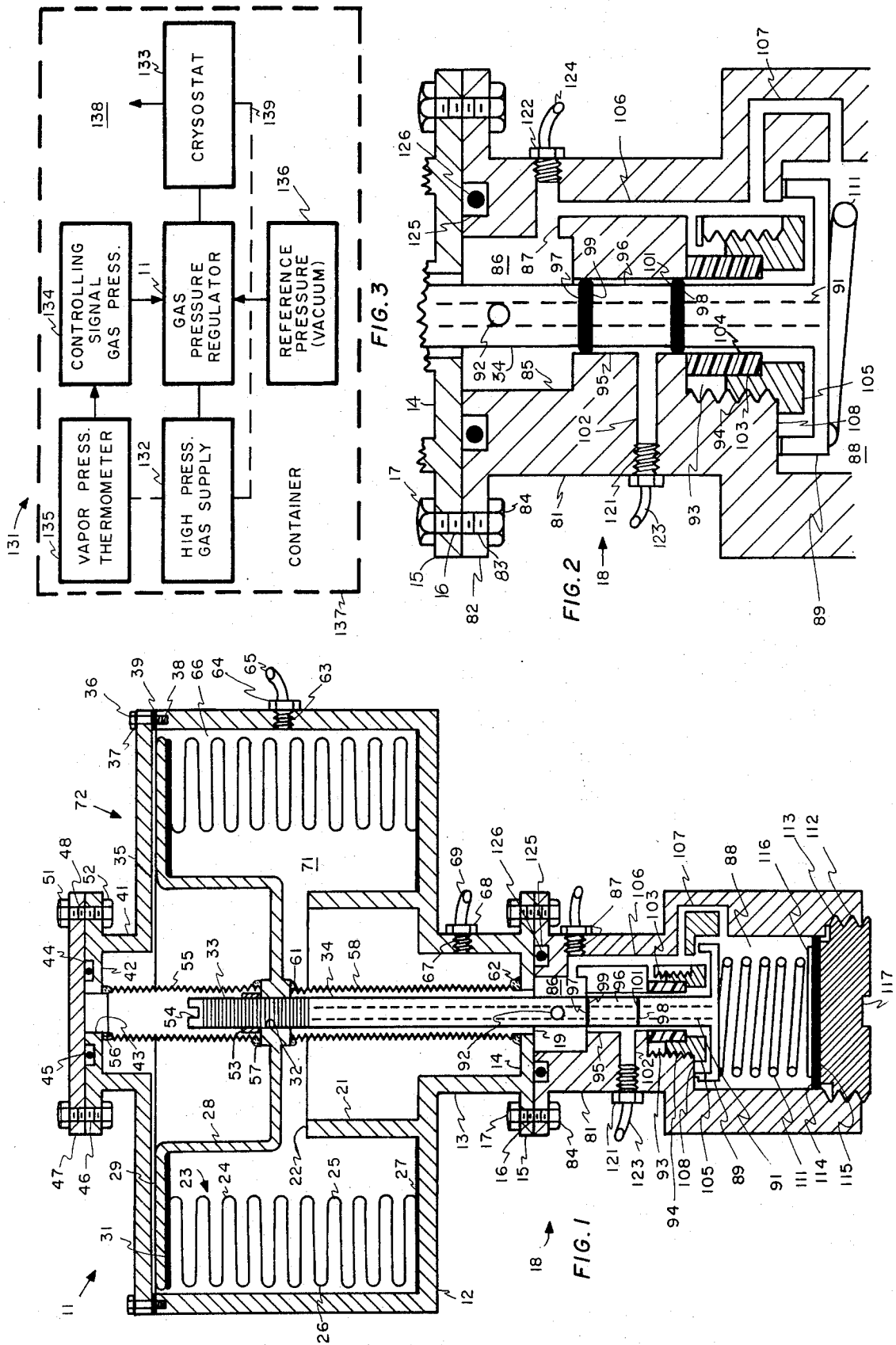

PRESSURE REGULATOR

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention, in general, pertains to gas pressure regulators, and, in particular, it is a pressure regulator that accurately and efficiently regulates the pressure of any of the gases supplied to swimmers and divers at both shallow and deep depths of water. In even greater particularity, the instant invention is a method and means that may be employed to regulate the various and sundry gas or other fluid pressures required by cryogenic life-support systems, regardless of whether they are of the scuba or habitat types, and regardless of ambient environmental pressure changes.

DESCRIPTION OF THE PRIOR ART

Heretofore, numerous pressure regulators have been used for many different purposes. For example, many of the prior art pressure regulators are used to control the pressure from the gas tanks of scuba divers, various pressure regulators are used to control the pressures of oxygen and acetylene gases in welding equipment, and air pressure regulators are employed to control the air pressure supplied to pneumatic control instruments in the oil and chemical process industries. Of course, for many practical purposes, the gas pressure regulators of the prior art are quite satisfactory — say, where, as a general rule, they are not subjected to substantial ambient pressure changes, and where the accuracy of the pressure regulation is not extremely critical — but where the accuracies required are such that they play a part of paramount importance in sustaining human and/or air breathing animal life at varying ambient environmental pressures, they ordinarily leave a great deal to be desired.

SUMMARY OF THE INVENTION

The instant invention is a unique balanced valve type gas pressure regulator for controlling the pressure of the gas supplied from any high pressure gas supply in conjunction with a predetermined reference pressure gas and an ambient environment gas or other fluid pressure. Although primarily intended for operation within a closed container, it will perform satisfactorily within practically any environmental medium, such as any subaqueous or other fluid medium, when properly designed therefor. Obviously, so doing would be well within the purview of one skilled in the art having the benefit of the teachings presented subsequently.

It is, therefore, an object of this invention to provide an improved gas pressure regulator.

Another object of this invention is to provide an improved method and means for regulating the pressure of helium in scuba diver cryogenic life support systems, or in habitats for human or other air breathing beings in underwater or other environments that would otherwise be hostile thereto.

Still another object of this invention is to provide an improved method and means for controlling the flow and/or pressure of one fluid medium in response to and in accordance with the pressure and/or temperature of another fluid medium.

Still another object of this invention is to provide an improved pressure regulator for reducing and regulating the flow and/or pressure of one fluid medium in response to and in accordance with the pressure and/or temperature of another fluid medium with respect to the pressure of still another predetermined reference fluid medium.

A further object of this invention is to provide an improved pressure balanced control valve.

Still another object of this invention is to provide an improved method and means for regulating the supply of helium or any other gas or gases to a cryostat or other utilization apparatus.

Another object of this invention is to provide an improved fluid pressure regulator that is sensitive and accurate, regardless of the ambient environmental medium within which it is operating.

Another object of this invention is to provide a fluid pressure regulator that is relatively easy and economical to manufacture, operate, and maintain.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 1 is an elevational view, mostly in cross-section but with some parts broken away, of the gas pressure regulator constituting the instant invention;

FIG. 2 is an enlarged elevational view, mostly in cross-section but with some parts broken away, of the balanced valve section of the gas pressure regulator of FIG. 1; and FIG. 3 is a block diagram of a representative system incorporating the subject invention.

DESCRIPTION OF THE PREFERRED EMBODIMENT

Referring now to FIG. 1, pressure regulator 11 is shown as being located and/or generated about a vertical axis of revolution and as including a somewhat cup-shaped housing 12 having a lower central circular extension 13 with a flange end-cap 14 connected thereto at the lower end thereof. Disposed around a flange 15 of end-cap 14 and near the periphery thereof are a plurality of holes 16, through which a plurality of bolts 17 are respectively extended for the purpose of attaching a balanced valve assembly section 18 thereto, as will be discussed in detail subsequently.

Through the center of flanged end-cap 14 is a hole 19, and extending upwardly (as shown in FIG. 1) from the shelf-like bottom of housing 12 is an open-ended pipe 21 configured in such manner that the top thereof will act as a stop 22 for an associated moving part. Disposed within housing 12 is a cylindrical control bellows 23 having a wall 24 which is corrugated or bends back upon itself in a conventional bellows manner, but so as to effectively form an inside wall 25 and an outside wall 26. Although a top view of control bellows 23 would show that it is cylindrical in shape with a wall thickness equal to the lengths of the back and forth folds thereof, in order to provide as simple a disclosure as possible, only the folds thereof are shown at the cross-sectional plane, with the remainder thereof broken away. Furthermore, it is opined that such disclosure of bellows 23 facilitates the disclosure of the chambers respectively disposed on both sides of the folded wall thereof, the explanation of which will be presented more fully subsequently. The bottom fold of corrugated bellows wall 24 is attached to and sealed at the upper surface of the bottom of housing 12, as by soldering, brazing, or welding 27, or the like. A cup-shaped head 28, having a diameter at least as large as the diameter of the aforesaid stop pipe 21, also includes a radially extending flange 29 from the top thereof which also extends around the aforesaid vertical axis of revolution in such manner that it is attached to and sealed at the top fold of corrugated wall 24 of bellows 23, as by soldering, brazing, or welding 31, or the like. Cup head 28 has a centrally located, internally threaded, hole 32 therethrough, through which the threaded portion 33 of an adjustment valve shaft or stem 34 extends in threaded engagement therewith.

An end cap 35 is connected to the upper end of the circular wall of housing 12 by means of a plurality of threaded bolts 36 extending through a like plurality of holes 37 therein and into a like plurality of threaded holes 38 in said wall. A gasket 39 is disposed between end cap 35 and the end of the wall of housing 12 for the purpose of making the connection thereat fluid tight.

End cap 35 contains a centrally and integrally disposed extension 41 having a flanged end closure plate 42 with a centrally located hole 43 therethrough. A circular groove 44 is located in the upper surface of plate 42 surrounding hole 43 and adapted for having an O-ring 45 of neoprene or some other resilient material inserted therein. The flanged portion of closure plate 42 has a plurality of holes 46 extending therethrough near the circular periphery thereof. Another end plate 47, having a like plurality of holes 48 in respective alignment with holes 46, is mounted against the upper end of closure plate 42 in abutment with O-ring 45 for effecting a fluid tight seal thereat. Another plurality of bolts 51 is respectively inserted through holes 46 and 48, and a like plurality of nuts 52 is threaded thereon in such manner as to hold closure plate 42 and end plate 47 tightly together.

Mounted on threaded portion 33 of shaft 34 is any suitable means for preventing the turning thereof within inside threaded hole 32 of upper cup 28, thereby preventing the inadvertent changing of the proper adjustment thereof. For example, said means may be any appropriate lock nut 53 that is either connected to or tightened in abutment with that portion of the lower surface of cup 28 in continuous disposition with threaded hole 32.

A notch 54 adapted for receiving the end of a screw driver (not shown) extending through hole 43 (when cap 47 is removed) facilitates making the proper adjustment of the lower operative end of shaft 34, as will be discussed more fully below.

A second bellows, an upper seal bellows 55, is mounted between that portion of the lower surface of plate closure 42 surrounding hole 43 and that portion of the upper surface of cup 28 surrounding hole 32 and lock nut 53. Both ends of bellows 55 are connected in fluid tight arrangements to the aforesaid respective surfaces by means of soldering, brazing, welding, or the like, 56 and 57.

A third bellows, a lower seal bellows 58, is connected between the bottom surface of cup 28 at that portion thereof surrounding hole 32 and the upper surface of end cap 14 surrounding hole 19 by means of soldering, brazing, or welding, or the like, 61 and 62, respectively.

The wall of housing 12 has a threaded hole 63 extending therethrough adapted for having a tube or hose fitting 64 screwed therein, so that a tube or hose 65 will be in fluid communication with a chamber 66 which constitutes that space between the inside walls and a portion of housing 12, end closure 35, end cap 47, the upper surface of cup 28, and the outside surfaces of bellows 23 and 55. Also, the wall of circular extension 13 likewise contains a threaded hole 67 extending therethrough adapted for having a tube or hose fitting 68 screwed therein, so that a tube or hose 69 will be in fluid communication with another chamber 71 which constitutes the space between the inside walls of extension 13, another portion of housing 12, the underside of cup 28, the inside surface of bellows 23, and the outside surface of lower seal bellows 58.

For purposes of clarity, the assembly described in detail so far is herewith defined as being the valve actuator section 72, although it should be obvious that the aforementioned valve stem 34 extends within both said valve actuator section 72 and the aforesaid valve assembly section 18.

At this time, the balanced valve assembly section 18 of the subject invention will be discussed in detail. For purposes of making this section of the invention as clear as possible, a portion thereof has been shown enlarged in FIG. 2, as well as in its normal relative size in FIG. 1. Hence, reference is now made to either or both of FIGS. 1 and 2 as necessary to refer to the same part depicted therein.

Connected in such manner as to extend downwardly from the aforesaid flanged end cap 14 is a body 81 having a flange 82 with a plurality of holes 83 extending therethrough which are in complementary alignment, respectively, with holes 16 in the flanged portion 15 of end cap 14. Of course, said plurality of bolts 17 extend down through holes 83, and a like plurality of nuts 84 are respectively tightened thereon, so as to securely attach body 81 to the bottom of cup extension 13.

As may readily be seen, valve body 81 contains a hole 85 extending therethrough, the upper portion thereof constituting an enlarged flow chamber 86 which is in fluid communication with down stream regulated fluid flow passageway 87, the inside of lower seal bellows 58, and another enlarged flow chamber 88.

At this time, it might be well to mention that valve stem 34 has an enlarged diameter, T-shaped (in cross-section) lower end 89, and a hole 91 extending through the entire length thereof. Another hole 92 through the wall of valve stem 34 provides fluid communication between body chamber 86, hole 91, and, thus, the inside of upper seal bellows 55 and body chamber 88 at all times, so that the pressures of the fluid therein is substantially the same, regardless of the fluid flowing through said chamber 86.

Immediately above chamber 88, another enlarged chamber 93 is located, with the inside diameter thereof having threads 94; and located between chambers 93 and 86 and in communication therewith is a bore constituting a valve sleeve or bore 95, within which a fluid pressure balanced valve 96 slidably rides. Of course, valve 96 is actually the fluid control valve of the invention, with the valve action thereof being performed by a pair of spatially disposed resilient O-rings 97 and 98 mounted in grooves 99 and 101, respectively, located at such position on valve stem shaft 34 that when stem 34 moves up and down, O-rings 97 and 98 slide in fluid tight seal arrangement within bore or sleeve 95.

A partially threaded entrance port or passageway 102, which is the upstream passageway connected to the output of the high pressure gas or fluid supply, is located in valve body 18 in such manner that it is in fluid communication with that portion of valve 96 located between O-rings 97 and 98, so that the fluid passing therethrough is controlled by the up and down (as shown) movement thereof.

At the lower end of bore 95, in abutment therewith, and just below O-ring 98 extending partially within chamber 93, is a porous hollow, cylindrically-shaped, filter ring 103 made of a polytetrafluoroethylene material - such as, for instance, Teflon, manufactured by E. I. DuPont de Nemours — that is mounted within said chamber 93 in such manner that it effectively constitutes a lower extension of bore 95 because the hollow bore 104 thereof has the same inside diameter as that of said bore 95. Porous ring 103 is held in place within chamber 93 of body 81 by means of a retainer nut 105 screwed into threads 94. The pores of ring 103 should be of such size and quantity that they allow the gas or other fluid being metered or controlled to pass therethrough whenever the pressure thereof on the inside diametrical surface exceeds that on the outside diametrical surface. Perhaps it should be understood at this time that the material, structural configuration, and finishing of filter ring 103 is of paramount importance in the metering and controlling of the operative gas or fluid; hence, it should be constructed with such characteristics in mind. For example, it should be strong enough to be properly held in place by retainer nut 105, porous enough to allow the metered gas to pass therethrough, and have an inside diametrical surface that is effectively self-lubricating, so that, when located therein, O-ring 98 will readily slide therein without sticking due to excessive friction, but still provide a sliding fluid-tight seal thereat.

The aforementioned chamber 93 is adjacent a portion of the outside diametrical surface of porous ring 103 and is in fluid communication with fluid exit passageway or port 87 by means of passageway 106 and in fluid communication with chamber 88 by means of passageway 107.

As previously mentioned, the enlarged diameter 89 of valve stem 34 is T-shaped in cross-section with the other diameter of the T extending upwardly in such manner as to come into valve stopping abutment at surface 108 of chamber 88 of valve body 81. Hence, when in its uppermost position, valve stem 34 and valve 96 — including O-rings 97 and 98 - are disposed substantially as shown in FIGS. 1 and 2, to thereby effect the shutting off of the gas from the high pressure supply passing through passageway 102.

As best seen in FIG. 1, end 89 of valve stem 34 is urged upwardly toward its stop position — and, therefore — toward a closed valve position — by a suitable resilient member, such as compressed spring 111, located in the aforementioned valve body chamber 88. Spring 111 is retained in chamber 88 of body 81 and compressed to a predetermined spring compression by means of an adjustment screw 112 screwed into internal threads 113 at the bottom of said body 81. An O-ring 114 is disposed in groove 115 located around the periphery of screw extension 116, so as to provide a fluid-tight seal between adjustment screw 112 and the inside surface of that portion of the wall at the lower end of body 81 surrounding chamber 88. Adjustment screw 112 has a slot 117 in the end thereof which facilitates the adjustment thereof by a screw driver or the like. Of course, if desired, any suitable lock nut or other locking means may be associated with adjustment screw 112 and body 81 to prevent the inadvertent turning thereof therein and, thus, prevent maladjustment of spring 111.

Obviously, as seen in FIGS. 1 and 2, body 18 has a particular design configuration; however, it should be understood that the geometrical configuration thereof may be any of many thereof which would suit any given operational situation. Of course, selecting the proper geometrical configuration therefor would merely involve the design choice of the artisan and would not violate the spirit or scope of the invention.

Regardless of the design selected for body 81, waterproofing between the lower end surface of actuator section 72 and the upper end surface of valve body 81 is preferably accomplished by means of a groove 125 located in said upper surface that is filled with a resilient O-ring 126, the latter of which is pressed against said lower end surface of actuator section 72.

To facilitate the connection of inlet port 102 and outlet port 87 to appropriate apparatus, tube or hose fittings 121 and 122 may be respectively screwed therein or brazed, soldered, or welded thereto, as is conventional in the art, and tubes 123 and 124 respectively connected thereto.

The foregoing description of pressure regulator 11 was presented in accordance with the attitude thereof illustrated in FIGS. 1 and 2 for the sake of convenience; however, it should be understood that the assembled structure thereof will function at any attitude and in conjunction with any compatible apparatus. Therefore, the applications therefor as a gas or fluid pressure regulator are many and varied, the employment of which would be well within the purview of one skilled in the art having the benefit of the teachings presented herewith.

Referring now to FIG. 3, there is shown a system 131 that represents a cryogenic scuba diver life support system in which the subject pressure regulator may be used to an advantage. Depicted therein is a high pressure helium gas supply 132, the output of which is connected to input port 102 of the aforesaid gas pressure regulator 11 constituting the subject invention. Output port 87 thereof is connected to the input of a cryostat 133. Connected to input port 63 of pressure regulator 11 is controlling signal gas pressure 134, the latter of which is effected by and proportional to the temperature of the aforesaid high pressure helium gas supply, as measured by a vapor pressure type thermometer 135 connected thereto. A reference pressure 136 — ordinarily a vacuum — is connected to inlet port 67 of pressure regulator 11.

From FIG. 3, it may be seen that elements 132, 11, 133, 134, 135, and 136, as they are incorporated within system 131, are housed in an appropriate container 137 and also that the output of cryostat 133 is vented to the internal chamber 138 thereof. Of course, the type and construction of container 137 is contingent upon the environmental medium within which it is disposed during any given operational circumstances.

Ordinarily, but optionally, high pressure gas supply and cryostat 133 have a thermal interconnection 139.

MODE OF OPERATION

The operation of the invention will now be discussed briefly in conjunction with FIGS. 1 and 2 of the drawing.

In this particular preferred embodiment of the invention, the controlling parameter is the controlling gas pressure (CGP) supplied to housing port 63. When, for example, this pressure rises, bellows 23 is caused to contract because said rising CGP is in direct contact with the external surface thereof. Such contraction, in turn, causes valve stem 34 to move downwardly (as shown in FIGS. 1 and 2) in such manner as to partially overcome the forces exerted against it in an upwardly direction by adjustable bias spring 111 and, of course, the forces of friction encountered within the subject pressure regulator, if any. The movement of valve stem 34, of course, causes lower O-ring 98 to likewise move downwardly and into that section of the valve bore occupied by porous ring 103. This allows the high pressure gas (HPG) supplied to inlet port 102 to pass between pressure tight O-rings 97 and 98 into and through said porous ring 103 and then into and out of regulated pressure passage 87 as the pressure regulated gas (PRG). Since the resistance to flow through porous ring 103 is relatively high, the gas pressure is throttled to the desired regulated pressure of the pressure regulated gas.

As a result of the pressure regulated gas (PRG) traveling through pressure balancing passages 93, 106, 86, 107, 91, 92, and 19, the pressure thereof is also maintained within upper and lower seal bellows 55 and 58 and at both ends of valve stem 34, thereby effectively causing the gas pressure metering valve 96 portion of the invention to be pressure balanced at all times. Such pressure balancing, of course, effectively removes all spurious bias or force differences from O-rings 97 and 98 that would otherwise be applied thereto and, hence, increases the sensitivity and pressure regulation accuracy thereof.

In order to insure that the set pressure (SP) — that is, the pressure at which it is desired to maintain the regulated gas — to remain as constant as possible, a reference pressure gas (RPG) is supplied to inlet port 67, so that the inside of bellows 23 and the outside of bellows 58 are subjected to some constant pressure. Although any of many different reference pressures — including a reference pressure that varies with the ambient pressure — may be used depending on the operational circumstances, it has been determined that a vacuum or incipient vacuum works quite well, especially in cryogenic systems, such as, for instance, one similar to that disclosed in FIG. 3.

As previously suggested, the pressure on the outside of bellows 23 effectively acts against the compression of spring 111. Accordingly, provision is made to adjust said spring compression by means of adjustment screw 112. Obviously, the greater the spring compression, the greater the pressure required to move valve 34, and the higher the set (SP) or regulated pressure point of the pressure regulated gas (PRG).

As it is structurally disclosed in FIG. 1, the fluid pressure regulator constituting this invention has numerous applications in pneumatic, hydraulic, and other fluid control systems, as well as in chemical process, artificial environmental process, oceanographic process, atmospheric process, and other process control systems. Therefore, it may readily be seen that its general utility is considerable. On the other hand, it also has a specific utility which is of paramount importance in cryogenic systems associated with cryogenic life-support systems, such as that depicted as system 131 in FIG. 3, the operation of which will now be briefly explained.

If, for example, it is desired to control the temperature of the cryostat, a high pressure cold helium gas supply is fed to inlet port 102 of pressure regulator 11, with the regulated output 87 thereof connected to the input of cryostat 133. Using vacuum 136 as the reference pressure, the control pressure is effected by controlling signal gas pressure 134, the pressure of which, in turn, changes in proportion to the vapor pressure in thermometer 135. Of course, the vapor pressure in thermometer 135 varies with the temperature of the cryostat. When the cryostat temperature rises, the cold high pressure helium (or other gas) is gradually released from gas supply 132. The temperature of the contained high pressure helium drops and takes up heat from the cryostat.

Obviously, by controlling the temperature of the high pressure helium gas supply, in this particular case, indirectly controls the temperature of cryostat 133 and vice versa, due to their physical and thermal connection 138. On the other hand, the temperature of cryostat 133 could be directly controlled by having thermometer 135 control signal gas pressure 134 as a result of being in thermal contact with said cryostat 133.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A pressure regulator, comprising in combination:

a valve body having a wall of such irregularly shaped configuration as to include a first open-ended chamber of first inside diameter, an open-ended internally-threaded second chamber of second inside diameter, an open-ended bore of third inside diameter which is smaller than said first and second inside diameters disposed between and in connection with said first and second chambers and disposed along and around a longitudinal axis common thereto, and a third open-ended chamber of fourth inside diameter that is larger than said second inside diameter in communication with and extending from said second chamber along and around said longitudinal axis;

an entrance passageway extending through the wall of said valve body in such manner as to effect fluid communication between said open-ended bore and the outside of said valve body;

an exit passageway extending through the wall of said valve body in such manner as to effect fluid communication between said first open-ended chamber and the outside of said valve body;

a porous ring having an inside diameter equal to the inside diameter of said open-ended bore located within said second chamber in contiguous disposition with an open end of said bore and in such manner as to extend along and around the aforesaid longitudinal axis;

means connected between said porous ring and the inside diameter of said second chamber for the secure retention thereof therein in such manner that a portion of said second chamber extends around a portion of the outside surface of said porous ring;

valve means located along said longitudinal axis, extending within and through said first open-ended chamber, extending within and through said bore for slidable movement and positioning therein, extending within and through said porous ring in such manner as to effect metered fluid communication between said entrance passageway and said exit passageway through a portion of the wall of the aforesaid porous ring in accordance with the position thereof therein, extending within and through said second chamber, and extending into said third chamber;

an intermediate passageway connected between a portion of said first, second, and third chambers, and a portion of the aforesaid exit passageway;

control means disposed adjacent to said first open-ended chamber and connected between one end of said valve body and one end of said valve means for effecting the movement thereof along said longitudinal axis in such manner as to effectively vary the aforesaid metered fluid communication between said entrance and exit passageways through the aforesaid porous ring in direct proportion to a controlling fluid pressure applied thereto; and adjustable resilient means connected between the other end of said valve body and the other end of said valve means for effecting the urging thereof along said longitudinal axis in such manner as to incipiently decrease the aforesaid metered fluid communication between said entrance and exit passageways through the aforesaid porous ring an amount that is in direct proportion to the urging applied thereto.

2. The invention of claim 1, further characterized by means connected to said entrance passageway for effecting the connection of a high pressure fluid supply thereto.

3. The invention of claim 1, further characterized by means connected to said exit passageway for effecting the connection of a predetermined utilization apparatus thereto which requires that a pressure regulated fluid be supplied thereto.

4. The device of claim 1, wherein said porous ring having an inside diameter equal to the inside diameter of said open-ended bore located within said second chamber in contiguous disposition with an open end of said bore and in such manner as to extend along and around the aforesaid longitudinal axis comprises a polytetrafluorothylene ring of predetermined porosity.

5. The device of claim 1, wherein said means connected between said porous ring and the inside diameter of said second chamber for the secure retention thereof therein in such manner that a portion of said second chamber extends around a portion of the outside surface of said porous ring comprises a retaining nut having external threads which are screwed into the internal threads of said second chamber.

6. The invention of claim 1, further characterized by means connected to said control means for supplying said controlling fluid pressure thereto.

7. The device of claim 1, wherein said control means disposed adjacent to said first open-ended chamber and connected between one end of said valve body and one end of said valve means for effecting the movement thereof along said longitudinal axis in such manner as to effectively vary the aforesaid metered fluid communication between said entrance and exit passageways through the aforesaid porous ring in direct proportion to a controlling fluid pressure applied thereto comprises a bellows means.

8. The device of claim 1, wherein said adjustable resilient means connected between the other end of said valve body and the other end of said valve means for effecting the urging thereof along said longitudinal axis in such manner as to incipiently decrease the aforesaid metered fluid communication between said entrance and exit passageways through the aforesaid porous ring an amount that is in direct proportion to the urging applied thereto, comprises:

an adjustment screw screwed into the end of said third chamber that is opposite the end thereof connected to said second chamber; and a spring disposed between the other end of said valve means and said adjustment screw.

9. The device of claim 1, wherein said valve means located along said longitudinal axis, extending within and through said first open-ended chamber, extending within and through said bore for slidable movement and positioning therein, extending within and through the inside diametrical surface of said porous ring in such manner as to effect metered fluid communication between said entrance passageway and said exit passageway through a portion of the aforesaid porous ring in accordance with the position thereof therein, extending within and through said second chamber, and extending into said third chamber comprises:

a first valve stem extending within and through said first open-ended chamber, said porous ring, and said second open-ended chamber, and extending partially within and through the aforesaid third open-ended chamber;

a first groove located in and around the periphery of that portion of said valve stem located between said first open-ended chamber and said entrance passageway;

a first O-ring disposed within said first groove around said valve stem for effecting a slidable fluid tight seal between said valve stem and the inside surface of said open-ended bore;

a second groove located in and around the periphery of said valve stem in spatial disposition from the aforesaid first groove and in such manner as to be located on the other side of said entrance passageway; and a second O-ring located in and around said second groove in such manner as to effect a fluid tight seal between the inside surface of said bore and the inside surface of said porous ring when moved in contact therewith, respectively.

10. The invention of claim 9 further characterized by:

a first hole extending through the entire length of said valve stem along the longitudinal axis thereof; and a second hole extending through the wall of said valve stem in such manner as to effect fluid communication between said first hole and the aforesaid first open-ended chamber.

* * * * *